United States Patent
Bernal et al.

(10) Patent No.: US 9,514,537 B2
(45) Date of Patent: Dec. 6, 2016

(54) SYSTEM AND METHOD FOR ADAPTIVE DEPTH MAP RECONSTRUCTION

(71) Applicant: Xerox Corporation, Norwalk, CT (US)

(72) Inventors: Edgar A. Bernal, Webster, NY (US); Wencheng Wu, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 144 days.

(21) Appl. No.: 14/141,610

(22) Filed: Dec. 27, 2013

(65) Prior Publication Data

US 2015/0187082 A1 Jul. 2, 2015

(51) Int. Cl.
*G06K 9/00* (2006.01)
*G06T 7/00* (2006.01)
*G06K 9/46* (2006.01)

(52) U.S. Cl.
CPC .......... *G06T 7/0075* (2013.01); *G06K 9/4604* (2013.01); *G06T 7/0057* (2013.01); *G06T 7/0081* (2013.01); *G06T 2207/10016* (2013.01); *G06T 2207/10024* (2013.01); *G06T 2207/20004* (2013.01); *G06T 2207/20104* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 5,107,845 A | 4/1992 | Guern et al. | |
| 5,800,360 A | 9/1998 | Kisner et al. | |
| 6,920,236 B2 | 7/2005 | Prokoski | |
| 6,958,809 B2 | 10/2005 | Sterling et al. | |
| 6,989,891 B2 | 1/2006 | Braig et al. | |
| 7,050,157 B2 | 5/2006 | Braig et al. | |
| 7,061,593 B2 | 6/2006 | Braig et al. | |
| 7,436,510 B2 | 10/2008 | Grun et al. | |
| 7,480,032 B2 | 1/2009 | Braig et al. | |
| 7,570,979 B2 | 8/2009 | Cooper | |
| 7,729,750 B2 | 6/2010 | Tromberg et al. | |
| 7,738,085 B2 | 6/2010 | Braig et al. | |
| 7,760,354 B2 | 7/2010 | Grun et al. | |
| 7,872,734 B2 | 1/2011 | Braig et al. | |

(Continued)

OTHER PUBLICATIONS

Danick Desjardins, Pierre Payeur. "Dense Stereo Range Sensing with Marching Pseudo-Random Patterns", IEEE 2007.*

(Continued)

*Primary Examiner* — Mark Roz
(74) *Attorney, Agent, or Firm* — Philip E. Blair; Fleit Gibbons Gutman Bongini & Bianco P.L.

(57) ABSTRACT

What is disclosed is a system and method for adaptively reconstructing a depth map of a scene. In one embodiment, upon receiving a mask identifying a region of interest (ROI), a processor changes either a spatial attribute of a pattern of source light projected on the scene by a light modulator which projects an undistorted pattern of light with known spatio-temporal attributes on the scene, or changes an operative resolution of a depth map reconstruction module. A sensing device detects the reflected pattern of light. A depth map of the scene is generated by the depth map reconstruction module by establishing correspondences between spatial attributes in the detected pattern and spatial attributes of the projected undistorted pattern and triangulating the correspondences to characterize differences therebetween. The depth map is such that a spatial resolution in the ROI is higher relative to a spatial resolution of locations not within the ROI.

4 Claims, 11 Drawing Sheets

(56) References Cited

U.S. PATENT DOCUMENTS

| | | | |
|---|---|---|---|
| 7,896,498 | B2 | 3/2011 | Munger et al. |
| 7,899,764 | B2 | 3/2011 | Martin et al. |
| 2006/0146560 | A1* | 7/2006 | Lewin .................... G01B 11/25 362/560 |
| 2009/0275808 | A1 | 11/2009 | DiMaio et al. |
| 2009/0318815 | A1 | 12/2009 | Barnes et al. |
| 2010/0249630 | A1 | 9/2010 | Droitcour et al. |
| 2010/0284082 | A1 | 11/2010 | Shpunt et al. |
| 2012/0289850 | A1 | 11/2012 | Xu et al. |
| 2013/0030699 | A1* | 1/2013 | Barnes ............... G01C 21/3679 701/455 |
| 2013/0079658 | A1 | 3/2013 | Cardoso et al. |
| 2013/0235178 | A1 | 9/2013 | Wang et al. |
| 2013/0307932 | A1 | 11/2013 | Mestha et al. |
| 2013/0322729 | A1 | 12/2013 | Mestha et al. |
| 2013/0342756 | A1 | 12/2013 | Xu et al. |

OTHER PUBLICATIONS

Bernal et al., "Respiratory Function Estimation From a 2D Monocular Video", U.S. Appl. No. 13/680,838, filed Nov. 19, 2012.

Mestha et al., "Generating a Flow-Volume Loop for Respiratory Function Assessment", U.S. Appl. No. 14/023,654, filed Sep. 11, 2013.

Batlle et al., "Recent Progess in Coded Structured Light As a Technique to Solve the Correspondence Problem: A Survey", Pattern Recognition, vol. 31, No. 7, 1998, pp. 963-982.

Salvi et al., "A State of the Art in Structured Light Patterns for Surface Profilometry", Pattern Recognition, vol. 43, 2010, pp. 2666-2680.

Scharstein et al., "High-Accuracy Stereo Depth Maps Using Structured Light", Computer Vision and Pattern Recognition (CVPR), vol. 1, 2003, pp. 195-202.

"2 Surface Profilometry: State of the Art".

Piratla et al., "Web-Based System and Method for Video Analysis", U.S. Appl. No. 13/417,979, filed Mar. 12, 2012.

Mestha et al., "Filtering Source Video Data Via Independent Component Selection", U.S. Appl. No. 13/281,975, filed Oct. 26, 2011.

Mestha et al., "Removing Environment Factors From Signals Generated From Video Images Captured for Biomedical Measurements", U.S. Appl. No. 13/401,207, filed Feb. 21, 2012.

Geng, Jason "Structured-Light 3D Surface Imaging: A Tutorial", by Jason Geng, Advances in Optics and Photonics vol. 3, pp. 128-160, Optical Society of America, Mar. 31, 2011.

Quan et al., "Shape measurement of small objects using LCD fringe projection with phase shifting," Optics Communications, vol. 189, pp. 21-29, 2001.

Groote et al., "Measurement of thoracoabdominal asynchrony: importance of sensor sensitivity to cross-section deformations," J. Appl. Physiol. 88, 1295-1302 (2000).

Levine et al., "Use of a triaxial magnetometer for respiratory measurements," J. Appl. Physiol. 70, 2311-2321(1991).

Allsop et al., "Application of long-period grating sensors to respiratory plethysmography," J. Biomed. Opt. 12, 064003 (2007).

Babchenko et al., "Fiber optic sensor for the measurement of respiratory chest circumference changes," J. Biomed. Opt. 4, 224-229 (1999).

Aliverti et al., "Optoelectronic plethysmography in intensive care patients," Am J Respir Crit Care Med 161, 1546-1552 (2000).

Saumarez, R.C., "Automated optical measurements of human torso surface movements during breathing," J. Appl. Physiol. 60, 702-709 (1986).

Ferrigno et al., "Three-dimensional optical analysis of chest wall motion," J. Appl. Physiol. 77, 1224-1231 (1994).

Aliverti et al., "Compartmental analysis of breathing in the supine and prone position by optoelectronic plethysmography," Ann. Biomed. Eng. 29, 60-70 (2004).

Chen et al., "Color structured light system of chest wall motion measurement for respiratory volume evaluation", J. Biomed. Opt. 15, 026013 (2010).

Drummond et al., "A video-based optical system for rapid measurements of chest wall movement," Physiol Meas 22, 489-503 (2001).

Zhang, Z., "A flexible new technique for camera calibration," IEEE Trans. on Pattern Analysis and Machine Intelligence, vol. 22(11), 1330-1334 (2000).

Poh et al., "Non-contact, automated cardiac pulse measurements using video imaging and blind source separation," Optics Express, vol. 18, No. 10, pp. 10762-10774, 2010.

Poh et al., "Advancements in non-contact, multiparameter physiological measurements using a webcam," IEEE Trans. on Biomedical Engineering, vol. 58, No. 1, Jan. 2011.

Rajapakse et al., "Approach and Applications of Constrained ICA," IEEE Trans. on Neural Networks, vol. 16, No. 1, Jan. 2005.

Moore, David, "A Real-World System for Human Motion Detection and Tracking", Final Thesis, California Institute of Technology, (2003).

Wang et al., "Intelligent Multimodal and Hyperspectral Sensing for Real-Time Moving Target Tracking", Applied Imagery Pattern Recognition Workshop (AIPR), pp. 1-8, (2008).

Al-Khalidi et al., "Tracking Human Face Features in Thermal Images for Respiration Monitoring", IEEE/ACS Int'l Conf. on Computer Systems and Applications (AICCSA), Hammamet, Tunisia, (May 16-19, 2010).

Fei et al., Analysis of Breathing Air Flow Patterns in Thermal Imaging, Proceedings of the 28th IEEE EMBS Annual International Conference, New York City, USA, pp. 946-952, (Aug. 30-Sep. 3, 2006).

Aoki et al., "Study on Respiration Monitoring Method Using Near-infrared Multiple Slit-lights Projection", IEEE International Symposium on Micro-NanoMechatronics and Human Science, pp. 291-296, (Nov. 7-9, 2005), ISBN: 0-7803-9482-8.

Eveland et al., "Tracking Human Faces in Infrared Video", Image and Vision Computing, vol. 21, pp. 579-590 (2003).

Aoki et al., Non-contact and Unrestrained Respiration Monitoring System for Sleeping Person Using Near-infrared Bright Spots Matrix Irradiation, IEEJ Transactions on Electronics, pp. 1251-1258, vol. 124, No. 6, (Sep. 2004).

Murthy et al., Non-Contact Monitoring of Breathing Function Using Infrared Imaging, pp. 1-17, Technical Report No. UH-CS-05-09, Apr. 9, 2005.

Jean-Francois Cardoso, "Blind signal separation: statistical principles", pp. 1-16, (Official Version published as: Proceedings of the IEEE, vol. 9, No. 10, pp. 2009-2025, Oct. 1998).

Hyvarinen, et al., "Independent Component Analysis: Algorithms and Applications", Neural Networks Research Centre, Helsinki University of Technology, Finland, Neutral Networks, pp. 1-31, 13(4-5); 411-430, 2000.

Xu et al., "Contemporaneously Reconstructing Images Captured of a Scene Illuminated With Unstructured and Structured Illumination Sources", U.S. Appl. No. 13/533,678, filed Jun. 26, 2012.

Xu et al., "Enabling Hybrid Video Capture of a Scene Illuminated With Unstructured and Structured Illumination Sources", U.S. Appl. No. 13/533,605, filed Jun. 26, 2012.

Bauchert et al., "Advances in liquid crystal spatial light modulators", Society of Photo Instrumentation Engineers, 2002.

Candes, Emmanuel J., "Compressive sampling", Proceedings of the International Congress of Mathematicians, Madrid, Spain, 2006.

Dudley et al., "Emerging Digital Micromirror Device (DMD) Applications", Society of Photo-Optical Instrumentation Engineers, 2003.

(56) References Cited

OTHER PUBLICATIONS

In-View Technology Corporation, "CS Camera Technology How a Compressive Sensing Camera Works", 2013.
Jenoptik, "Liquid Crystal Spatial Light Modulators", Aug. 2012.
Li et al., "Visual attention guided bit allocation in video compression", Image and Vision Computing 29, 2011.
Robucci et al., "Compressive Sensing on a CMOS Separable-Transform Image Sensor", Proceedings on IEEE, Apr. 22, 2009.
Wen et al., "Low Bit-Rate Video Streaming for Face-To-Face Teleconference", Proceedings on IEEE, 2004.
Bernal et al., "Processing a Video for Tidal Chest Volume Estimation", U.S. Appl. No. 13/486,637, filed Jun. 1, 2012.
Bernal et al., "Minute Ventilation Estimation Based on Depth Maps", U.S. Appl. No. 13/486,682, filed Jun. 1, 2012.
Bernal et al., "Minute Ventilation Estimation Based on Chest Volume", U.S. Appl. No. 13/486,715, filed Jun. 1, 2012.
Bernal et al., "Processing a Video for Respiration Rate Estimation", U.S. Appl. No. 13/529,648, filed Jun. 21, 2012.

\* cited by examiner

SYSTEM AND METHOD FOR ADAPTIVE DEPTH MAP RECONSTRUCTION

TECHNICAL FIELD

The present invention is directed to systems and methods for adaptively reconstructing a depth map of a scene.

BACKGROUND

Active/passive systems for range or depth sensing, which are based on a calibrated projector-camera or camera-camera pair, are one of the most reliable and cost-effective ways to generate a depth map of a scene. One limitation of sensing systems is the computational intensity of the depth map estimation process, which limits the acquisition speed of the system. Other depth sensing systems, such as Time-of-Flight systems, have similar limitations. There is a trade-off between spatial resolution and computational complexity; specifically, the larger the spatial resolution of the depth map, the more computationally expensive the depth map generation process becomes. Consequently, when improvement of depth data throughput is desired, it is typically performed at the expense of the detail in the depth map. Additionally, in most depth-sensing applications, even though a particular scene is monitored for depth information, only an area or subject within the scene is usually of interest. By performing adaptive depth map reconstruction with variable spatial resolution (higher on regions of interest, lower elsewhere), data throughput can be controlled.

What is needed in this art is a system and method which can adaptively reconstruct a depth map of a scene.

BRIEF SUMMARY

What is disclosed is a system and method for adaptively reconstructing a depth map of a scene. In one embodiment, the present method involves the following. In response to having received a mask identifying a region of interest (ROI) in a scene, a spatio-temporal attribute of a pattern of source light projected on the scene and/or an operative resolution of a depth map reconstruction module is changed. Thereafter, at least one imaging device is used to sample measurements or otherwise image that scene. The depth map reconstruction module then receives the measurements and reconstructs a depth map of that scene which has a spatial resolution $R_{ROI}$ in the ROI which is higher than a spatial resolution $R_{other}$ of scene locations not associated with the ROI. In another embodiment, at least two imaging devices with overlapping fields of view such that salient features in said scene are simultaneously imaged by at least two devices in the array acquire images of the scene. The depth map reconstruction module establishes correspondences between said salient features, determines offsets between said established correspondences, and triangulates said offsets to obtain depth values. The mask may identify multiple ROI's and the reconstructed depth map will be such that $R_{other} < R_{ROI_1} < R_{ROI_2} \leq \ldots R_{ROI_N}$, where N is the number of ROIs identified by the mask.

Features and advantages of the present system and method will become apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
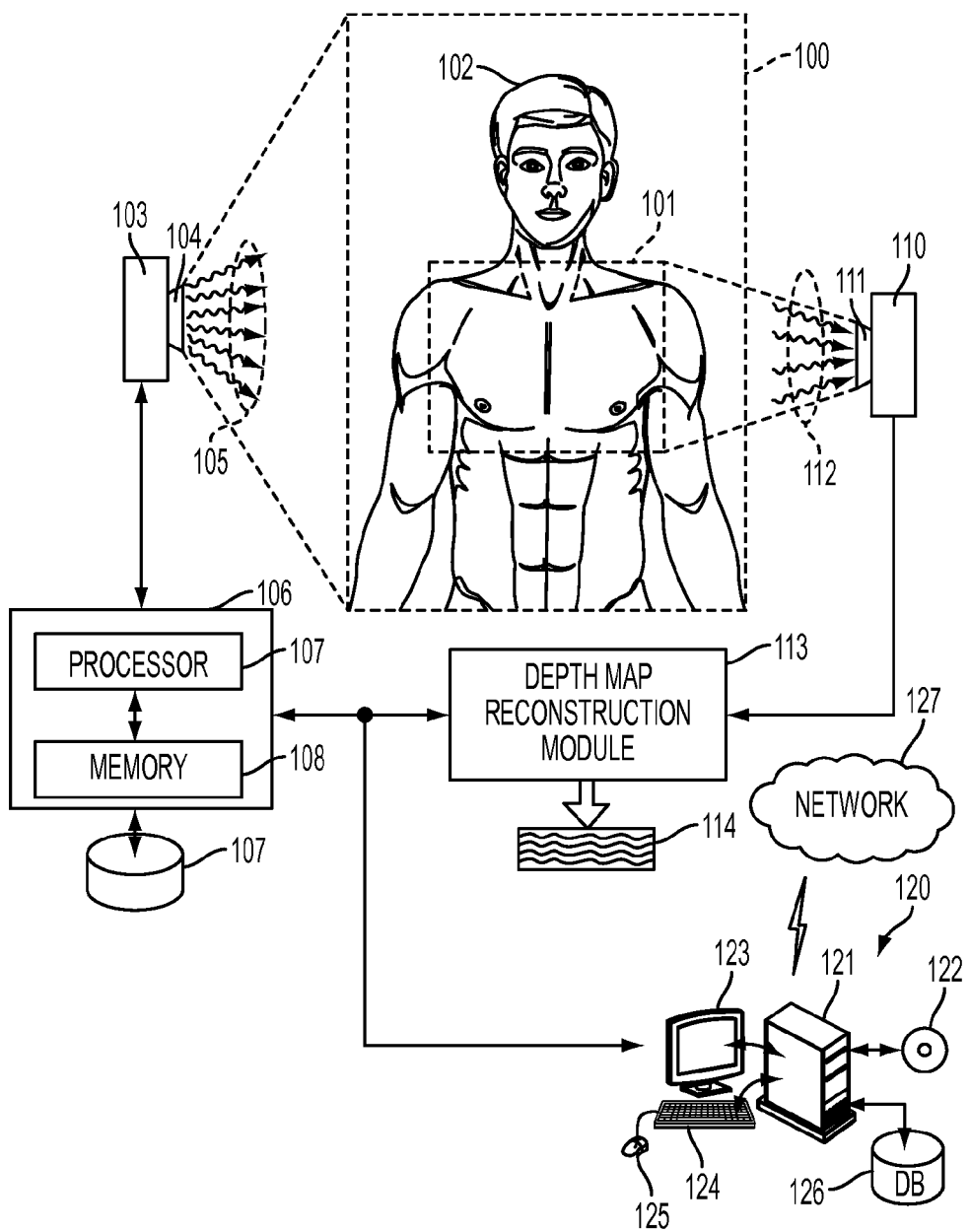
FIG. 1 shows one embodiment of an example active stereo sensing system for adaptively reconstructing a depth map of a scene in accordance with the teachings hereof.

What is disclosed is a system and method for adaptively reconstructing a depth map of a scene.

NON-LIMITING DEFINITIONS

An "image" of a scene, as is generally understood, is an array of pixels with each pixel having an associated location in the image and a value representative of a measured reflectance of the scene at that pixel location.

A "region of interest", a "ROI" is an identified area of a scene whose depth map is intended to be reconstructed using the teachings disclosed herein with a higher quality relative to the depth maps of other areas of that scene. What defines a particular region of interest will largely depend on the application where the present invention finds its uses. A region of interest can be identified from an image of a scene that is acquired with an imaging device such as a camera. Alternatively, the image of the scene is acquired with a separate imaging device having a significantly similar view point of the scene. In yet another embodiment, the image of the scene is received from an existing database of images. A region of interest is then identified from the image of the scene. In yet another embodiment, a region of interest is identified from a depth map of a scene initially reconstructed at a nominal resolution by the stereo system. In yet another embodiment, a region of interest is identified from an image of a scene and a corresponding depth map. In yet another embodiment, a region of interest is identified from a temporal sequence of images or depth maps of a scene. Regions of interest can be identified by processing at least one image and/or at least one depth map of the scene using any of: pixel classification, object identification, facial recognition, color, texture, spatial features, spectral information, pattern recognition, motion detection, foreground detection, and a user input. The location, shape or size of the identified region of interest can change over time. Once a region of interest has been identified, changes in the location of the identified region of interest can be identified by tracking techniques. Alternatively, re-identification of the region of interest based on performing recurrent pixel classification, object identification, facial recognition, color, texture, spatial features, spectral information, pattern recognition, motion detection, foreground detection, depth-based segmentation, or a user input.

A "mask" identifies regions of interest in a scene. The mask can be dynamically updated in real-time in response to a new region of interest having been identified in the scene, a location of an existing region of interest changing in the scene, a region of interest no longer being of interest, and a user input. The mask may be received at a highest desired resolution $R_{max}$. If the mask is received at a resolution which is less than a highest desired resolution, the mask can be upsampled. The mask may be received from a remote device over a network via a wired or wireless pathway, or retrieved from a storage device such as a memory or a hard drive. The mask may have binary values, in which case, pixels associated with the region of interest may have '1' values and pixels not associated with the region of interest may have '0' values. Alternatively, the mask may have integer values, where pixels with different values may be associated with different regions of interest.

A "depth map" is a spatially varying two-dimensional signal with values being proportional to the depth of the scene relative to the depth-sensing device at the location in the scene corresponding to the location in the depth map.

Figure 2:
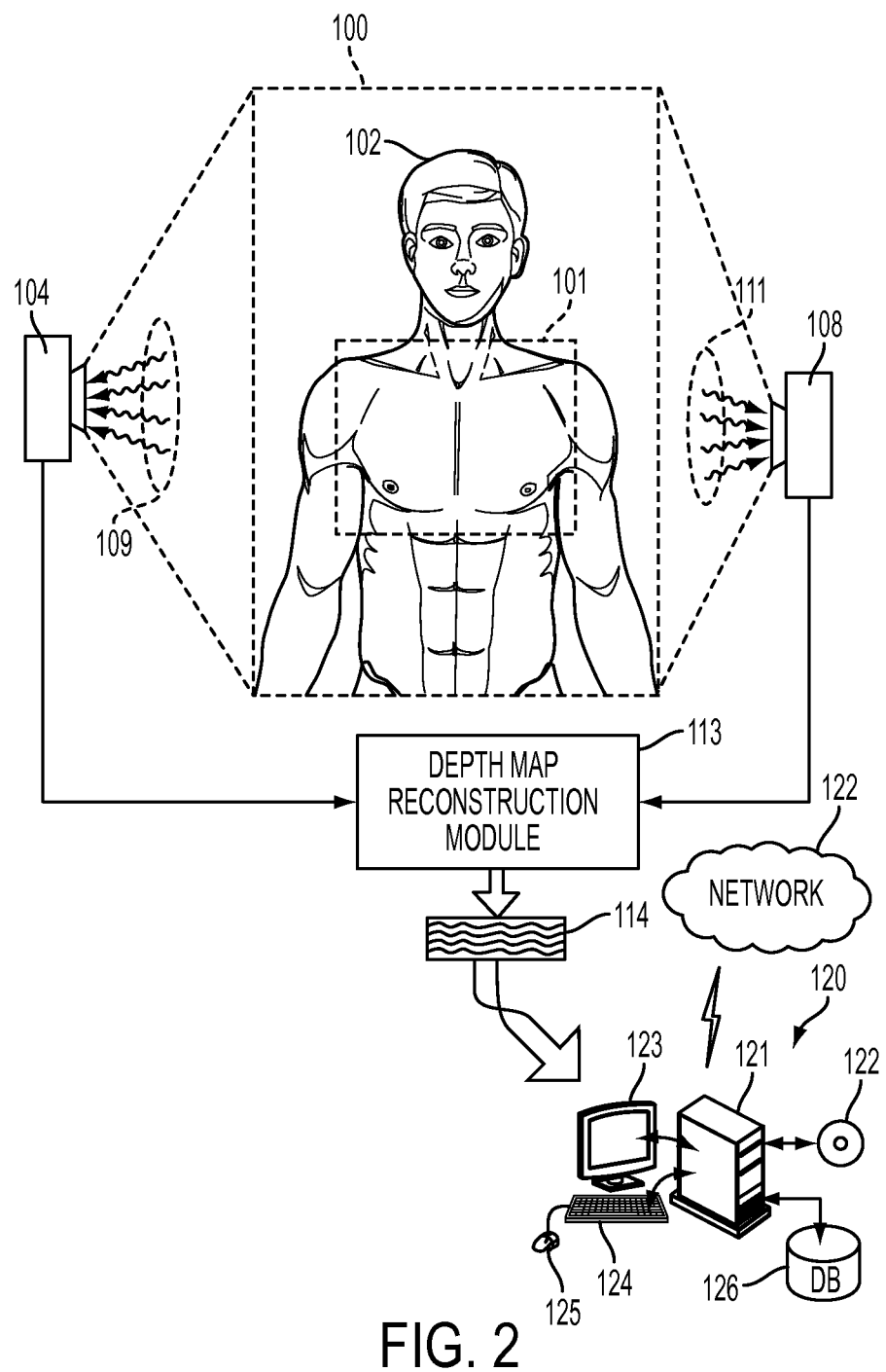
FIG. 2 shows another embodiment of an example passive stereo sensing system for adaptively reconstructing a depth map of a scene in accordance with the teachings hereof.

A "range- or depth-sensing device" is a device that estimates a depth map of a scene. One such device is an active stereo system comprising an illuminator and a camera or imaging device. The imaging device detects a reflection of light projected onto a scene by the illuminator. Examples of imaging devices include: a monochrome camera, a color camera, an infrared depth camera, a multispectral camera, a hyperspectral camera, or a combination thereof. The illuminator, which may be coupled with a light modulator, projects source light in the electromagnetic band where the imaging device is sensitive. Various sensing devices are shown in the embodiments of FIGS. 1 and 2. Another such device is a passive stereo system which samples measurements of light reflected off surfaces in a scene via two or more imaging devices with overlapping fields of view. The imaging devices are positioned such that salient features in the scene can be imaged by two or more imaging devices simultaneously. Examples of imaging devices include: a monochrome camera, a color camera, an infrared depth camera, a multispectral camera, a hyperspectral camera, or a combination thereof. Yet another such device is a range-sensing system such as a time-of-flight camera, a RADAR device, a LiDAR device, or a photo-wave device. Time-of-flight devices resolve distance based on the known speed of propagation of a wave by measuring the time-of-flight of a light or sound source between the sensor and different points in the scene. In some cases, a time-of-flight device includes a point-by-point scanning laser or light pulse that sweeps across different points in the scene and performs depth measurement at each point in the scene across which the sweep occurred.

In other cases, scannerless systems comprising arrays of point-by-point range devices are used, wherein depth values for multiple points in the scene are acquired simultaneously can be used. Combinations of both technologies (e.g., sweeping a one-dimensional array of point-by-point devices) may be utilized.

A "Spatial Light Modulator (SLM)" or simply "Light Modulator" is a device which modulates light, for example, in order to enable adaptable projection of an undistorted pattern of source light with known spatio-temporal attributes. The projected pattern of light can be any pattern such as, for instance, a pattern with uniform or non-uniform spatial attributes, a pattern with textural spatial attributes, a pattern with spatial attributes comprising a sinusoidal grating, or a pattern having pseudo-random spatial attributes. Multiple patterns of light can also be projected in sequence. Examples of spatial light modulators include, but are not limited to Digital Micromirror Devices, Transmissive Liquid Crystals and Liquid Crystals on Silicon, as are generally understood.

A "depth map reconstruction module" is a system comprising, for example, a processor and a memory for generating a depth map of a scene by aggregating individual depth measurements. In one embodiment, where an active stereo sensing system is used, depth map reconstruction is performed by establishing correspondences between spatial attributes in the detected pattern and spatial attributes of the projected undistorted pattern, and triangulating the established correspondences to characterize offsets or displacements therebetween. Correspondences are established with the aid of coding techniques. These offsets are converted to absolute depth values based on the known relative placement between the imaging device and the projector, as well as on the intrinsic parameters of the projector and imaging device in a process known as triangulation. When the relative placement or the parameters are not known, relative depth values can still be obtained via triangulation. Methods for finding correspondences include: a correlation-based method, a relaxation-based method, dynamic-programming-based method, and prediction-and-verification-based method. Such methods are well understood in the art. In another embodiment where a passive stereo sensing system is used, the depth map reconstruction module generates a depth map of a scene by characterizing offsets or displacements between locations of salient features identified in the images captured by at least two imaging devices with overlapping fields of view of the scene. These offsets are converted to absolute depth values which comprise the depth map using a conversion which is based on the offsets, the known relative placement between the at least two imaging devices, and the intrinsic parameters of the imaging devices. The depth map can also comprise relative values which are obtained when some of the parameters in the system are not known. Depth values of locations not associated with the salient features can be interpolated from the depth values of locations associated with the salient features. In yet another embodiment where a time-of-flight system is used, a depth map is then reconstructed by aggregating a plurality of point depth measurements corresponding to a plurality of points in the scene, each of the plurality of depth measurements obtained by point-by-point range measurement. A multiplicity of depth measurements can be acquired by sweeping the point-by-point device or by arranging them in one- or two-dimensional arrays.

"Changing an operative resolution" of the depth map reconstruction module means spatially adjusting the resolution of the reconstructed depth map by adjusting parameters or algorithms in the depth map reconstruction procedure. Changing an operative resolution of the depth map reconstruction module may be performed globally in order to achieve a given data throughput, or locally as determined by the location of one or more ROIs, where the density of reconstruction at locations corresponding to the ROI is increased. Equivalently, the density of reconstruction of locations not corresponding to the ROI is decreased. In one embodiment where an active stereo system is used, changing an operative resolution of the depth map reconstruction module comprises changing a density of the correspondences determined between the spatial attributes of the projected pattern and the spatial distortions of the detected distorted pattern. Correspondences are established with the aid of coding techniques. Once the correspondences between each pixel (at different densities) have been determined, the depth of each point for which a correspondence has been found can be recovered via projective transformations known in the arts. The density of correspondences can be adjusted by changing a spatio-temporal attribute of the pattern of source light projected onto said scene by the illuminator, by changing a density of correspondences established by the depth map reconstruction module, or both. This is because active stereo systems rely on spatial multiplexing, temporal multiplexing or a combination of both. Structured illumination patterns that rely on spatial multiplexing allow correspondences to be found by assigning specific characteristics to specific locations in and around local neighborhoods of the pattern. These unique characteristics are encoded based on spatial attributes of the neighborhoods including spatially varying intensity or color values. Temporal multiplexing can be used as an alternative or in conjunction with spatial multiplexing. Temporal multiplexing methods create unique attributes via the successive projection of patterns onto the object surface. The attribute associated with a position in the image is not completely recovered until all patterns corresponding to the location have been projected and measured. Some methods combine spatial and temporal information to take advantage of both approaches. These methods are described in "*A State Of The Art In Structured Light Patterns For Surface Profilometry*", J. Salvi, S. Fernandez, T. Pribanic and X. Llado, Pattern Recognition, Vol. 43, pp. 2666-2680, (2010), incorporated herein in its entirety.

In another embodiment wherein a passive stereo system is used, changing an operative resolution of the depth map reconstruction module means changing a density of correspondences of salient features in the multiple images acquired by the imaging devices in the passive stereo system or changing the spatial resolution for interpolating depth values of locations not associated with the correspondences utilizing the derived depth values of locations associated with the correspondences, or both. A density of depth values can be controlled by adjusting the density of extracted features to match in the images. A density of extracted features can be adjusted, for example, by varying a selectivity threshold that determines the degree of saliency required for a feature to be considered salient: the lower the threshold, the more lenient the requirements for saliency, and, in consequence, the larger the number of salient features extracted. Methods for establishing correspondences are described in: "*Recent Progress In Coded Structured Light As A Technique To Solve The Correspondence Problem: A Survey*", J. Battle, E. Mouaddib and J. Salvi, Pattern Recognition, Vol. 31, No. 7, pp. 963-982, (1998), and in: "*High-Accuracy Stereo Depth Maps Using Structured Light*", D. Scharstein and R. Szeliski, Computer Vision and Pattern Recognition (CVPR), Vol. 1, pp. 195-202, (2003), both of which are also incorporated herein in their entirety.

In yet another embodiment where a time-of-flight measurement system is used, changing an operative resolution of a depth map reconstruction module can be achieved, for example, by either increasing the density of point-by-point range measurements at locations associated with the ROI or decreasing the density of point-by-point range measurements at locations associated with the ROI, or both.

The operative resolution of the depth map reconstruction module may be changed globally in order to achieve a given data throughput, or changed locally as determined by the location of one or more ROIs, where the density of reconstruction at locations corresponding to the ROI is increased, or, equivalently, the density of reconstruction of locations not corresponding to the ROI is decreased.

Example Active Stereo Sensing System

Reference is now being made to FIG. 1 which shows one example sensing system for adaptively reconstructing a depth map of a scene utilizing active stereo sensing in accordance with the teachings hereof.

In FIG. 1, mask 100 identifies a region of interest (ROI) 101 in an example scene. As shown, the region of interest is a chest area of the person 102. Illuminator 103 includes a light modulator (not shown) which modulates source light from the illuminator to produce an undistorted pattern of light with known spatio-temporal attributes (shown as a plurality of light rays 105). The undistorted pattern of source light is projected onto the scene. Shown in communication with the light modulator is a special purpose computer 106 comprising a processor and memory. The special purpose computer may be on a single chip or, for example, a computer workstation. Storage device 107, in one embodiment, contains machine-readable program instructions executed by the processor enable the special purpose computer system to operate in two modes. In a first mode, the special purpose computer 106 changes one or more spatio-temporal attributes of the undistorted pattern 105 projected onto the scene. In a second mode, the special purpose computer changes an operative resolution of the depth map reconstruction module such that a density of correspondences is changed between spatial distortions detected in the pattern of reflected light and spatial attributes of the undistorted pattern of projected light. In a third mode, a combination of the first two modes can be used. Active stereo systems rely on spatial multiplexing, temporal multiplexing or a combination of both in order to enable correspondences to be established. Structured illumination patterns that rely on spatial multiplexing allow correspondences to be found by assigning specific characteristics to specific locations in and around local neighborhoods of the pattern. These unique characteristics are encoded based on spatial attributes of the neighborhoods including spatially varying intensity or color values. The resolution of the reconstructed depth map can be increased by increasing the density of said spatial attributes via appropriate spatial modulation techniques effectuated by the light modulator. Temporal multiplexing can be used as an alternative or in conjunction with spatial multiplexing. Temporal multiplexing methods create unique attributes via the successive projection of patterns onto the object surface. The attribute associated with a position in the image is not completely recovered until all patterns corresponding to the location have been projected and measured. The resolution of the reconstructed depth map can be increased by increasing the number of different said successive patterns corresponding to a given location via appropriate temporal modulation techniques effectuated by the light modulator. Some methods combine spatial and temporal information to take advantage of both approaches.

For example, in one embodiment where spatial multiplexing coding is used, different locations in the pattern are assigned different colors or shapes of light for unique identification. Neighborhoods assigned a given pattern color or shape in the pattern and at locations not corresponding to the ROI may be larger than neighborhoods assigned a given pattern color in the pattern and at locations corresponding to the ROI. Alternatively, neighborhoods of equal size can be used, while larger numbers of neighborhoods are assigned at locations corresponding to the ROI relative to locations not corresponding to the ROI. In the case where sequences of patterns are used to code a location, a unique sequence of colored patterns may be projected onto each location in the scene. Specifically, if M different colors are used in sequences of length N, then $M^N$ different locations can be uniquely encoded. For a fixed number of possible colors, shorter sequences can be used to encode locations not corresponding to the ROI relative to those used to encode locations corresponding to the ROI. For example, in one embodiment, a new color code at locations not corresponding to the ROI can be projected for every two, three or four color codes projected at locations corresponding to the ROI. Combinations of spatial and temporal multiplexing can, for example, project unique sequences of colored patterns onto the scene with progressively higher spatial resolution. The rate at which the spatial resolution of the pattern increases can be higher at locations corresponding to the ROI relative to locations not corresponding to the ROI. Also, the number of unique colors assigned to sequences used at locations corresponding to the ROI can be larger than that assigned to sequences used at locations not corresponding to the ROI.

Imaging device 110 receives incoming light and has detectors or sensors (not shown) which sample measurements of electromagnetic radiation in a wavelength range containing the wavelength of the projected source light. The reflected pattern of light is shown as a plurality of rays, collectively at 112. In one implementation, the sensors detecting the pattern of reflected light are located so that the optical axis of the imaging device 110 is approximately perpendicular to the surface of the ROI 101. Other implementations involve placing the illuminator/modulator and the imaging device at different angles so that it senses the reflected light pattern sufficient for depth map reconstruction. Depth map reconstruction module 113 generates a plurality of depth maps, collectively at 114, by establishing correspondences between spatial attributes in the detected reflected pattern of light and spatial attributes of the projected undistorted pattern and triangulating the established correspondences to characterize differences therebetween. Correspondences are established with the aid of coding techniques. It should be appreciated that the depth maps are illustrative.

Workstation 120 is shown having computer case 121 which houses a motherboard with a processor and memory, a communications link such as a network card, graphics card, and the like, and other software and hardware to perform the functionality of a computing device as is generally known in the arts. The motherboard reads/writes to a computer readable media 122 such as a floppy disk, optical disk, CD-ROM, DVD, magnetic tape, etc. The workstation includes a display device 123 such as a CRT, LCD, touch screen, etc., a keyboard 124 and a mouse 125. Information may be entered by a user of the present system using the graphical user interface. For example, the operative resolution of the depth map reconstruction module may be changed in response to a user using the workstation to select a desired pixel density for a region of interest or to select regions of interest in the scene. A user may further use the workstation to generate the mask from images captured of the scene. The workstation has a storage device 126. The workstation, including processor 107 and memory 108, are shown placed in communication with one or more remote devices over network 127, which may comprise a wired or wireless connection.

Example Passive Stereo Sensing System

Reference is now being made to FIG. 2 which shows one example passive stereo sensing system for adaptively reconstructing a depth map of a scene in accordance with the teachings hereof. Descriptions regarding various system components similarly labeled in the system of FIG. 1 are not repeated.

In FIG. 2, mask 100 identifies a region of interest 101 of a chest area of a person 102. Imaging devices 109 and 111 are positioned such that salient features in the scene can be imaged by the two imaging devices. The imaging mode associated with a passive stereo system comprising a two-camera (or binocular) system is known as stereoscopy; it is then said that the scene is stereoscopically imaged. Images 109 and 111, shown as a collection of light rays, are provided to a depth map reconstruction module 113 which generates depth maps 114 of the scene by establishing correspondences between salient features in the received images and triangulating the offsets or displacements between the established correspondences across images acquired by multiple imaging devices in the system to obtain depth values. These offsets can be converted to absolute depth values based on the known relative placement between the imaging devices and on the known intrinsic parameters of the imaging devices. If some or all of the parameters are not known, relative depth values can still be computed. The depth maps are communicated to the workstation 120.

It should be appreciated that the workstation 120 of FIGS. 1 and 2 has an operating system and other specialized software configured to display a wide variety of numeric values, text, scroll bars, pull-down menus with user selectable options, and the like, for entering, selecting, or modifying information displayed on the display device. The embodiment shown is only illustrative. Moreover, any of the Information obtained from any of the components of the system of FIGS. 1 and 2 can be saved to storage device 126. Although shown as a desktop computer, it should be appreciated that workstation can be a laptop, mainframe, client/server, or a special purpose computer such as an ASIC, circuit board, dedicated processor, or the like.

Flow Diagram of Active Stereo Sensing System Embodiment

Figure 3:
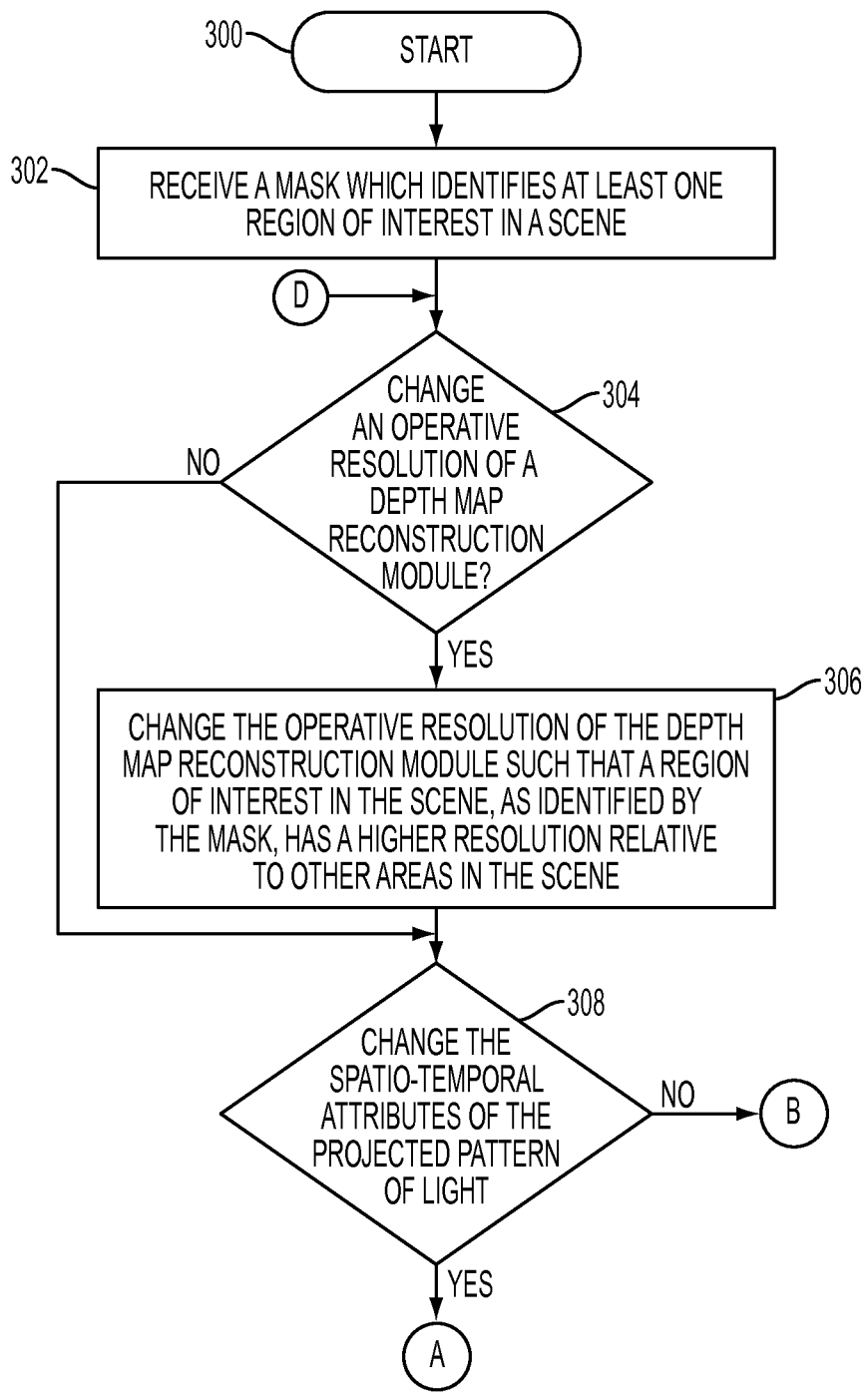
FIG. 3 is a flow diagram which illustrates one embodiment of the present method for adaptively reconstructing a depth map of a scene utilizing the active stereo sensing system of FIG. 1.

Reference is now being made to the flow diagram of FIG. 3 which illustrates one embodiment of the present method for adaptively reconstructing a depth map of a scene utilizing the active stereo sensing system of FIG. 1. Flow processing starts at step 300 and immediately proceeds to step 302.

At step 302, receive a mask which identifies at least one region of interest in a scene. The mask may be generated by processing an image of the scene captured by a camera or a video system. A region of interest, such as the example thoracic region 101 of the person 102, can be identified in an image using any of a wide array of techniques.

At step 304, a determination is made whether to change the operative resolution of the depth map reconstruction module. If it is desired not to change the operative resolution of the depth map reconstruction module then processing continues with respect to step 308. Otherwise, processing continues with respect to step 306.

At step 306, change an operative resolution of the depth map reconstruction module. Changing the operative resolution effectively changes a density of correspondences between spatial distortions in the detected pattern of reflected light and spatial attributes of the projected undistorted pattern of light. Active stereo systems rely on spatial multiplexing, temporal multiplexing or a combination of both in order to enable correspondences to be established. Structured illumination patterns that rely on spatial multiplexing allow correspondences to be found by assigning specific characteristics to specific locations in and around local neighborhoods of the pattern. These unique characteristics are encoded based on spatial attributes of the neighborhoods including spatially varying intensity or color values. The resolution of the reconstructed depth map can be increased by increasing the density of said spatial attributes via appropriate spatial modulation techniques effectuated by the light modulator. Temporal multiplexing can be used as an alternative or in conjunction with spatial multiplexing. Temporal multiplexing methods create unique attributes via the successive projection of patterns onto the object surface. The attribute associated with a position in the image is not completely recovered until all patterns corresponding to the location have been projected and measured. The resolution of the reconstructed depth map can be increased by increasing the number of different said successive patterns corresponding to a given location via appropriate temporal modulation techniques effectuated by the light modulator. A combination of spatial and temporal modulation techniques can be used, At step 308, a determination is made whether to change the spatio-temporal attributes of the projected pattern of light. If it is desired to change the spatio-temporal attributes of the pattern of light then processing continues with respect to node A of FIG. 4. Otherwise, processing continues with respect to node B of FIG. 4.

Figure 4:
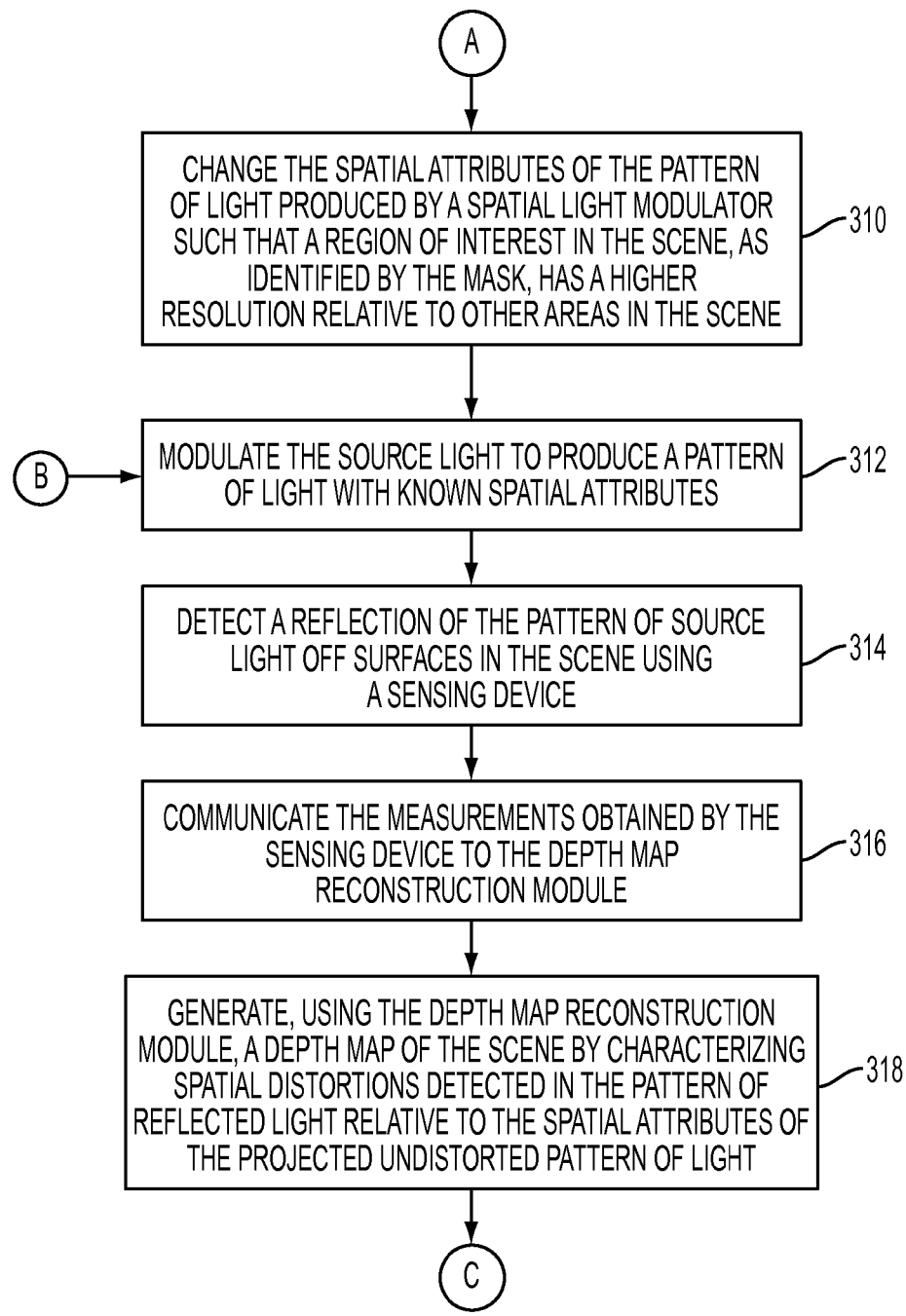
FIG. 4 is a continuation of the flow diagram of FIG. 3 with flow processing continuing with respect to nodes A or B.

Reference is now being made to FIG. 4 which is a continuation of the flow diagram of FIG. 3 with flow processing continuing with respect to nodes A or B. At step 310, change a spatio-temporal attribute of the pattern of light projected by the light modulator such that a region of interest in the scene, as identified by the mask, has a higher spatial or temporal resolution relative to other areas in the scene. Spatial or temporal attributes of the pattern of light may be changed in response to a user selecting a desired pixel density for a region of interest identified by the mask using the workstation 120 of FIG. 1. In another embodiment, one or more desired spatial or temporal attributes can be retrieved from memory 108 and used by the processor 107. For example, in one embodiment where spatial multiplexing coding is used, different locations in the pattern are assigned different colors or shapes of light for unique identification. Neighborhoods assigned a given pattern color or shape in the pattern and at locations not corresponding to the ROI may be larger than neighborhoods assigned a given pattern color in the pattern and at locations corresponding to the ROI. Alternatively, neighborhoods of equal size can be used, while larger numbers of neighborhoods are assigned at locations corresponding to the ROI relative to locations not corresponding to the ROI. In the case where sequences of patterns are used to code a location, a unique sequence of colored patterns may be projected onto each location in the scene. Specifically, if M different colors are used in sequences of length N, then $M^N$ different locations can be uniquely encoded. For a fixed number of possible colors, shorter sequences can be used to encode locations not corresponding to the ROI relative to those used to encode locations corresponding to the ROI. For example, in one embodiment, a new color code at locations not corresponding to the ROI can be projected for every two, three or four color codes projected at locations corresponding to the ROI. Combinations of spatial and temporal multiplexing can, for example, project unique sequences of colored patterns onto the scene with progressively higher spatial resolution. The rate at which the spatial resolution of the pattern increases can be higher at locations corresponding to the ROI relative to locations not corresponding to the ROI. Also, the number of unique colors assigned to sequences used at locations corresponding to the ROI can be larger than that assigned to sequences used at locations not corresponding to the ROI.

At step 312, modulate the light to produce a pattern of light with known spatio-temporal attributes. Special purpose computer 106 and the workstation 120 are in communication with the light modulator 104 such that the light is modulated to project a desired undistorted pattern 105 onto the scene.

At step 314, detect the reflected pattern of projected source light using the imaging device within the active stereo sensing system. Imaging device 110 detects the reflected pattern 112 off surfaces in the scene.

At step 316, communicate the measurements obtained by the imaging device to the depth map reconstruction module.

At step 318, generate, using the depth map reconstruction module, a depth map of the scene. In this embodiment, the depth map is generated by establishing correspondences between spatial attributes in the detected pattern and spatial attributes of the projected undistorted pattern and triangulating the established correspondences to characterize differences therebetween. Correspondences are established with the aid of coding techniques. The differences determined therebetween can be converted to depth values. If parameters of the active stereo sensing system such as baseline and intrinsic parameters of the illuminator and the camera are known, the obtained depth values are absolute; otherwise, relative values can be obtained. The depth map of the scene is reconstructed using the depth values. The depth map is such that a spatial resolution $R_{ROI}$ in the ROI is higher relative to a spatial resolution $R_{other}$ of scene locations not associated with the ROI, where: $R_{other} < R_{ROI}$. Multiple ROIs can be identified, each with a corresponding $R_{ROI}$. Alternatively, a single ROI corresponding to the whole scene can be identified, and densities of the reconstructed depth map can be adjusted globally to adhere to certain data throughput constraints Reference is now being made to FIG. 5 which is a continuation of the flow diagram of FIG. 4 with flow processing continuing with respect to node C.

At step 320, communicate the depth map to a display device of a computer workstation. One display is shown in the workstation of FIG. 1. The depth map may be communicated to a remote device over the network 127 using, for instance, a wireless cellular protocol.

At step 322, a determination is made whether to generate another depth map from the current mask. If another depth map is desired then processing continues with respect to node D of FIG. 3 wherein, at step 304, another determination is made whether to change the operative resolution of the depth map reconstruction module. Processing continues and flow repeats in a manner as described for each depth map of the scene desired to be generated until no more depth maps are desired using the current mask.

At step 324, a determination is made whether to update the current mask. If the current mask does not need to be updated and no more depth maps are desired to be generated then, in this embodiment, further processing stops. If it is desired to update the mask (or produce a new mask) because, for instance, a region of interest has changed in the scene or a new region of interest in the scene has been identified then, at step 326 the current mask is updated (received or produced) and flow continues with respect to node D wherein, at step 304, processing repeats in a similar manner as described. Processing repeats as depth maps of the scene are repeatedly generated until no more depth maps are desired. Thereafter, further processing stops.

Flow Diagram of Passive Stereo Sensing System Embodiment

Figure 6:
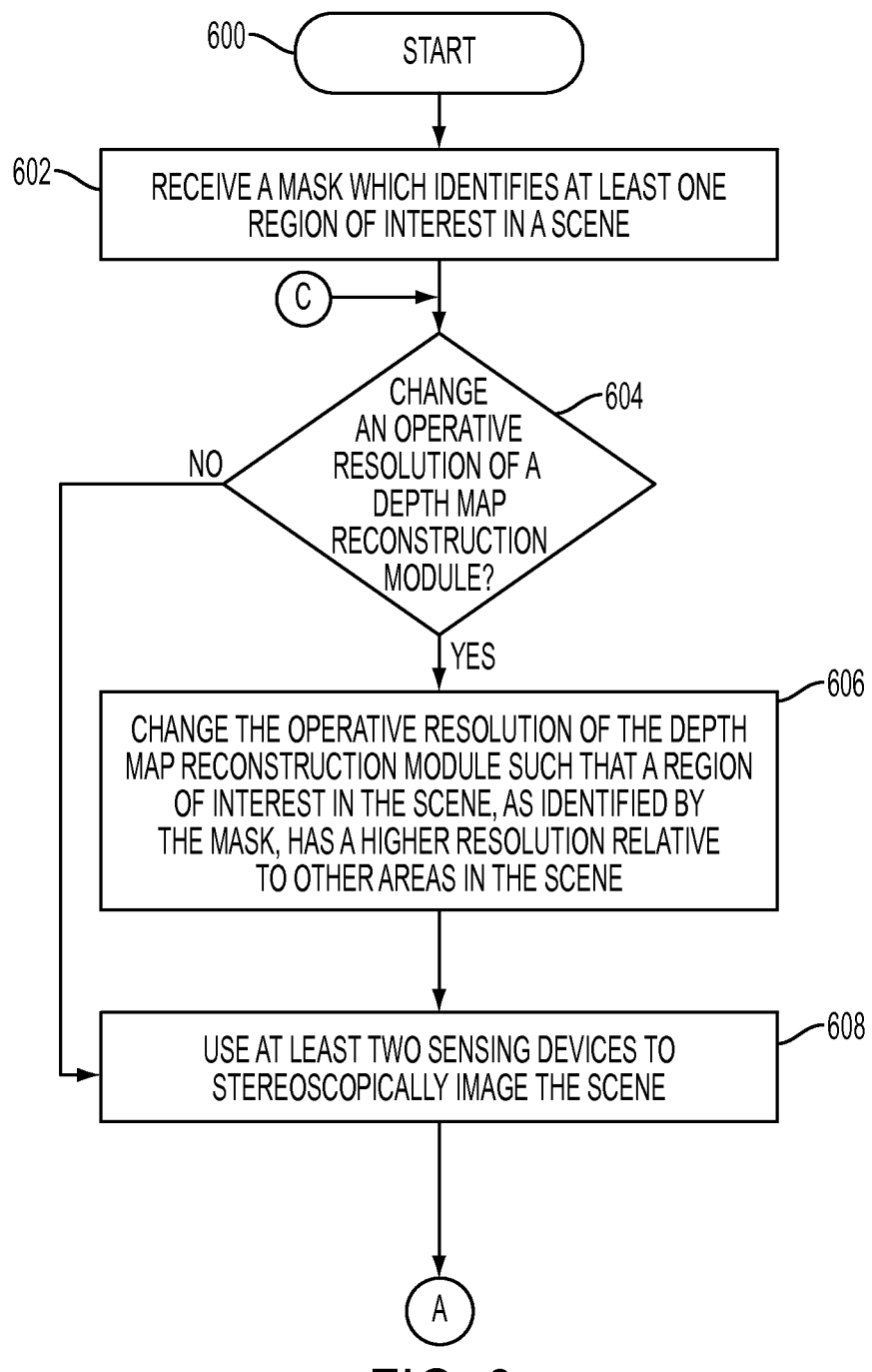
FIG. 6 is a flow diagram which illustrates one example embodiment of the present method for adaptively reconstructing a depth map of a scene utilizing the passive stereo sensing system of FIG. 2.

Reference is now being made to the flow diagram of FIG. 6 which illustrates one example embodiment of the present method for adaptively reconstructing a depth map of a scene utilizing the passive stereo sensing system of FIG. 2. Flow processing starts at step 600 and immediately proceeds to step 602.

At step 602, receive a mask which identifies at least one region of interest in a scene.

At step 604, a determination is made whether to change the operative resolution of the depth map reconstruction module. If it is desired not to change the operative resolution of the depth map reconstruction module then processing continues with respect to step 608. Otherwise, processing continues with respect to step 606.

At step 606, change an operative resolution of the depth map reconstruction module. Changing the operative resolution effectively changes a density of correspondences between salient features captured in the at least two images of the scene or the spatial resolution for interpolating depth data of locations not associated with said correspondences utilizing the derived depth data of locations associated with said correspondences or both. A density of extracted features can be adjusted, for example, by varying a selectivity threshold that determines the degree of saliency required for a feature to be considered salient: the lower the threshold, the more lenient the requirements for saliency, and, in consequence, the larger the number of salient features extracted.

At step 608, use at least two imaging devices with overlapping fields of view to image the scene. A stereoscopically imaged scene is shown in the embodiment of FIG. 2.

Figure 7:
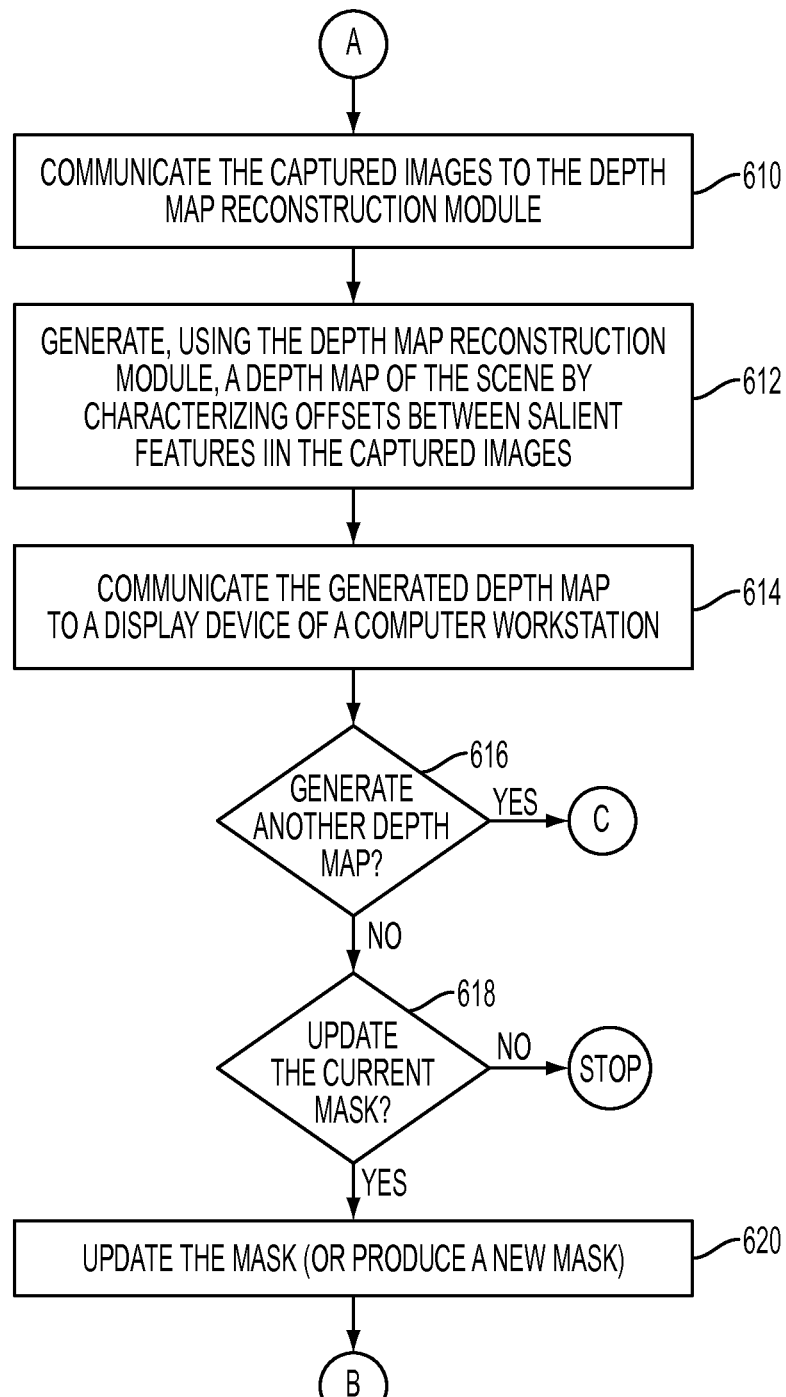
FIG. 7 is a continuation of the flow diagram of FIG. 6 with flow processing continuing with respect to node A.

Reference is now being made to the flow diagram of FIG. 7 which is a continuation of the flow diagram of FIG. 6 with flow processing continuing with respect to node A.

At step 610, communicate the images to the depth map reconstruction module.

At step 612, generate, using the depth map reconstruction module, a depth map of the scene by characterizing offsets between salient features in the images. The offsets can be readily converted to absolute depth values based on the known relative placement between the imaging devices in the passive stereo system and on known intrinsic parameters of the imaging devices used to capture those images. Depth values of locations not associated with salient features can be interpolated from the depth values of locations associated with the salient features. The depth map of the scene is reconstructed using the depth values. Relative depth values can be obtained if some of the parameters in the passive sensing system are not known. The depth map generated is such that a spatial resolution $R_{ROI}$ in the ROI is higher relative to a spatial resolution $R_{other}$ of scene locations not associated with the ROI, where: $R_{other} < R_{ROI}$. Multiple ROIs can be identified, each with a corresponding $R_{ROI}$. Alternatively, a single ROI corresponding to the whole scene can be identified, and densities of the reconstructed depth map can be adjusted globally to adhere to certain data throughput constraints.

At step 614, communicate the depth map to a display device of a computer workstation. One display is shown in the workstation of FIG. 1. The depth map may be communicated to a remote device over the network 127.

At step 616, a determination is made whether to generate another depth map from the current mask. If another depth map of this scene is desired then processing continues with respect to node C of FIG. 6 wherein, at step 604, another determination is made whether to change the operative resolution of the depth map reconstruction module. Processing continues and flow repeats in a manner as described for each depth map of the scene desired to be generated until no more depth maps are desired using the current mask.

At step 618, a determination is made whether to update the current mask. If the current mask does not need to be updated and no more depth maps are desired to be generated then, in this embodiment, further processing stops. If however it is desired to update the mask (or produce a new mask) because, for instance, a region of interest has changed in the scene or a new region of interest in the scene has been identified then, at step 620 the current mask is updated (or received new mask produced) and flow continues with respect to node B wherein, at step 604, processing repeats in a manner as described. Processing repeats as depth maps of the scene are repeatedly generated until no more depth maps of the scene are desired. Thereafter, further processing stops.

It should be understood that the flow diagrams hereof are illustrative. One or more of the operations may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable program instructions.

Block Diagram of an Active Stereo Sensing System

Figure 5:
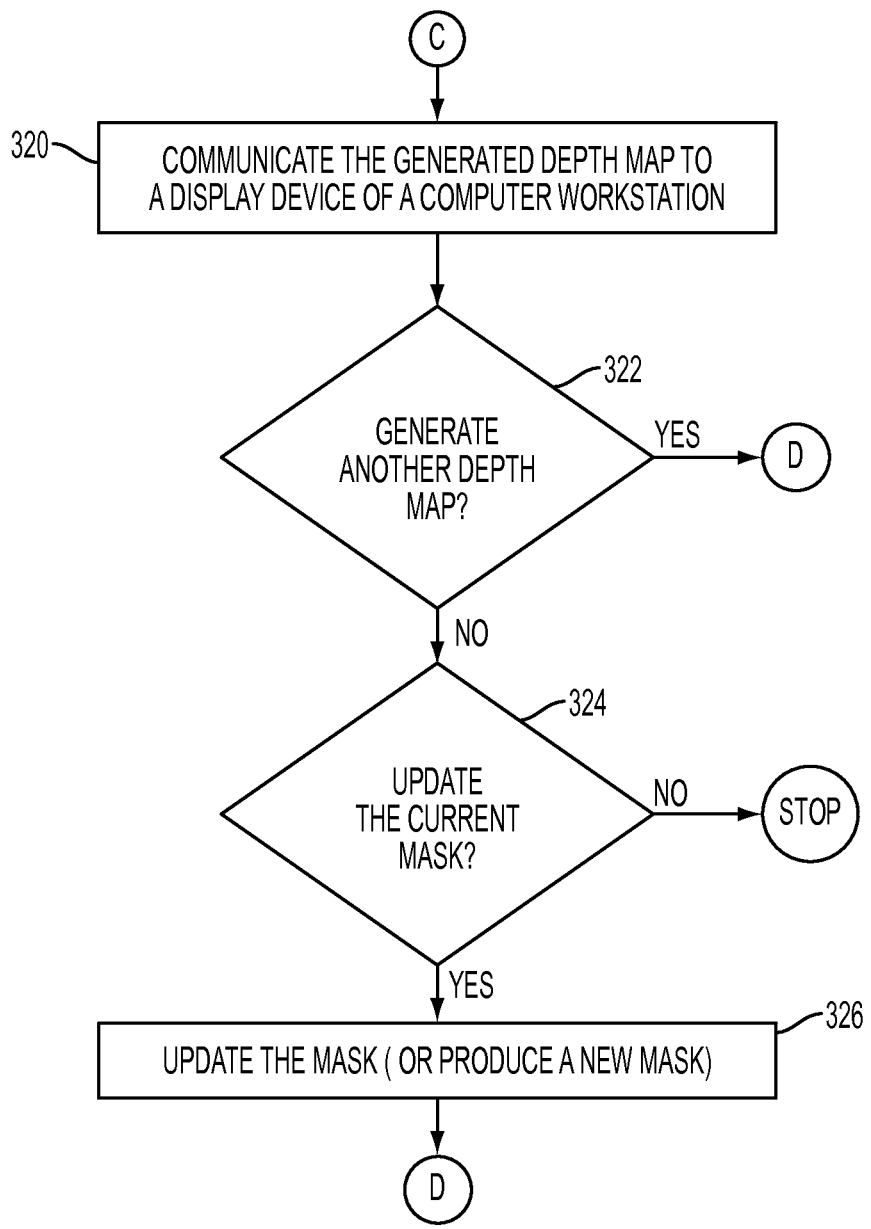
FIG. 5 is a continuation of the flow diagram of FIG. 4 with flow processing continuing with respect to node C.
Figure 8:
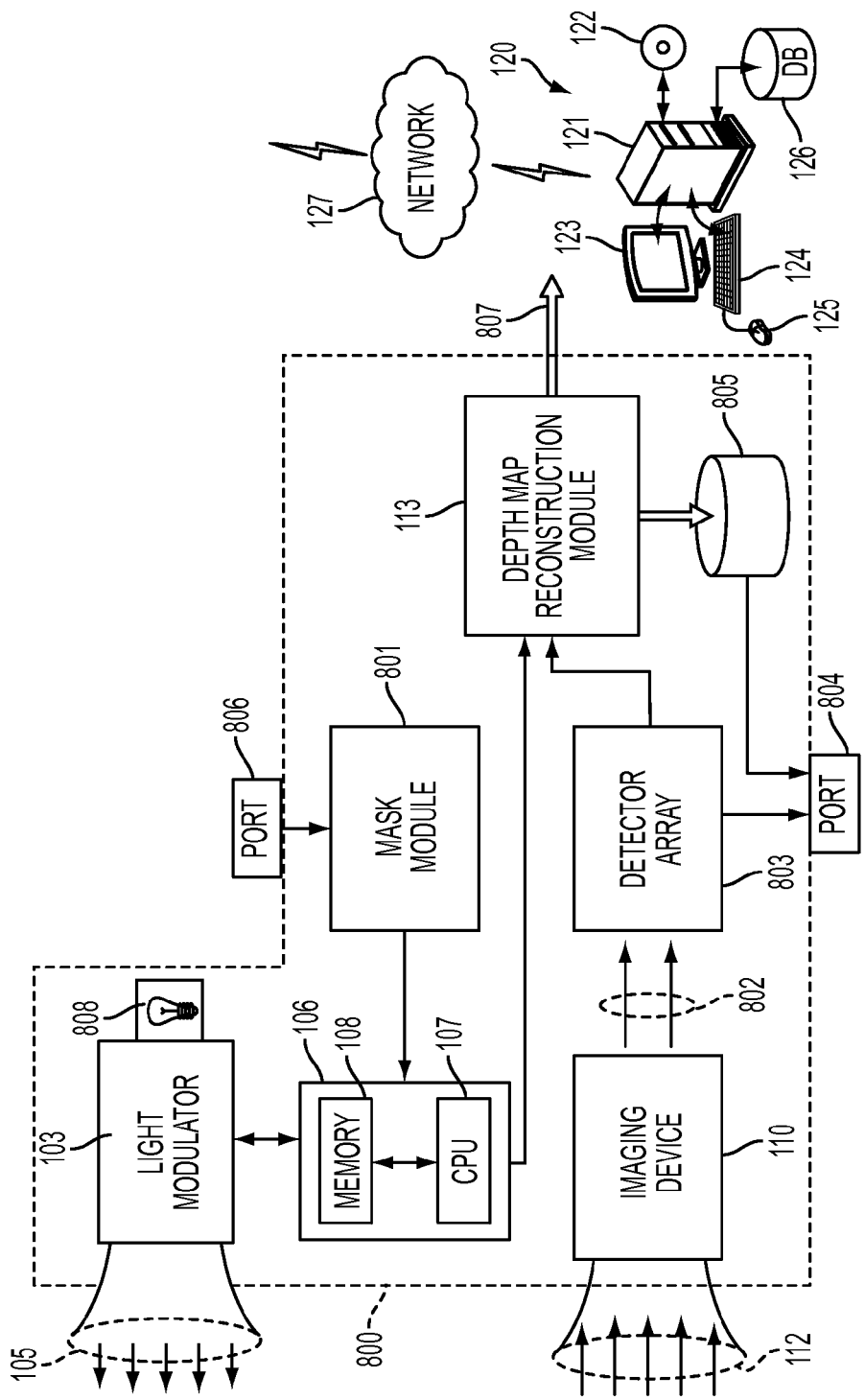
FIG. 8 is a block diagram of the active stereo sensing system wherein various aspects of the present method, as described with respect to the flow diagrams of FIGS. 3-5, are performed.

Reference is now being made to FIG. 8 which shows a block diagram of the sensing system 800 for performing various aspects of the present method as described with respect to the flow diagrams of FIGS. 3-5. The system of FIG. 8 illustrates a plurality of modules and devices placed in communication with the networked workstation of FIG. 1.

In the system of FIG. 8, mask module 801 receives a mask via communication port 806 and provides the mask to the special purpose computer 106 of FIG. 1 shown comprising a central processing unit (CPU) and a memory. The processor executes machine-readable program instructions which enable the electronically-controllable light modulator 103 to change one or more spatial attributes of an undistorted pattern of source light 105 projected onto the scene and for changing an operative resolution of the depth map reconstruction module 113. The projected undistorted pattern of light reflects off surfaces in the scene such as, for instance, the chest area of person 102. Distortions are introduced into the projected pattern by surface variations thereof. A reflection of the projected light 112 enters imaging device 110 wherein the incoming light is focused (at 802) onto a detector array or sensor array (at 803) which samples measurements of electromagnetic radiation in a wavelength range containing the wavelength of the projected source light emitted by illuminator 808. Detectors 803 output measurements which, in this embodiment, are communicated to a remote device via communication port 804 which may comprise, for example, a USB or a network cable.

Depth map reconstruction module 113 receives the measurements and generates a depth map of the scene. Depth maps generated by the depth map reconstruction module are communicated to storage device 805 and may be communicated to one or more remote devices over communication port 804. The depth maps generated by the depth map reconstruction module 113 are provided to a workstation 120 via bus 807. The workstation is in communication with one or more remote devices over network 127 using, for example, a network card internal to the workstation.

Using the user interface of the workstation, a user thereof may change or control the functionality of any of the modules and processing units comprising the system 800. Depth maps, masks, and the like, can be displayed on the display monitor 123 wherein various aspects thereof can be added, deleted, or otherwise modified by a user. Measurements and values generated by the system 800 may be displayed on the display device. Masks can be generated using the workstation and communicated to the mask module 801 via port 806. The pattern of modulated light 105 and/or the detected reflected pattern 112 may be communicated to the workstation via bus 807 and displayed on the display monitor 123. A user can selectively set desired pixel density levels, select spatial patterns or define attributes of the spatial patterns, and may further define or otherwise set a desired operative resolution for the depth map reconstruction module. The workstation may further be used to identify one or more regions of interest in an image of the scene. The identified regions of interest can be communicated to the mask module 801, depending on the embodiment. The mask module may update the mask in response to the user input, in response to a region of interest changing in the scene, and a region of interest no longer being considered a region of interest. An operator of the workstation may modify the results generated by any of the modules or processing units of the adaptive depth sensing system 800 as needed and/or re-direct the modified results back to the same or different modules for further processing or re-processing.

Block Diagram of a Passive Stereo Sensing System

Figure 9:
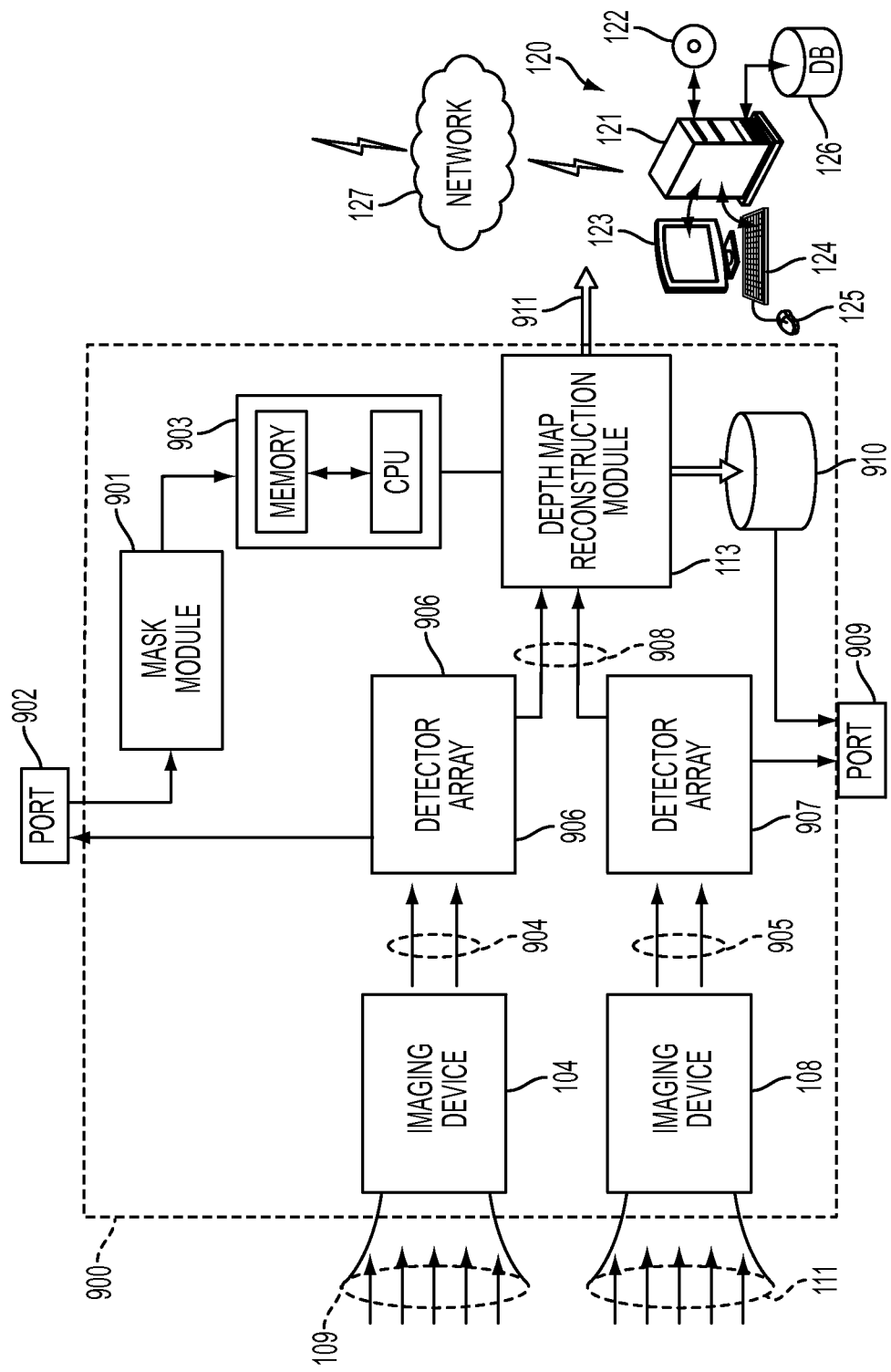
FIG. 9 is a block diagram of the passive stereo sensing system wherein various aspects of the present method, as described with respect to the flow diagrams of FIGS. 6-7, are performed.

Reference is now being made to FIG. 9 which shows is a block diagram of the passive stereo sensing system 900 wherein various aspects of the present method, as described with respect to the flow diagrams of FIGS. 6-7, are performed. The system of FIG. 9 illustrates a plurality of modules and devices placed in communication with the networked workstation of FIG. 2.

In the system of FIG. 9, mask module 901 receives a mask via communication port 902 and provides the mask to the special purpose computer 903 shown comprising a central processing unit (CPU) and a memory. The processor executes machine-readable program instructions for changing the operative resolution of the depth map reconstruction module 113. Imaging devices 108 and 108 capture images of the scene by directing incoming light, at 904 and 905, respectively, onto their respective detector arrays 906 and 907. Images of the scene are communicated to the depth map reconstruction module 113. Each of the detector arrays 906 and 907 communicate their respective images to one or more remote devices via communication ports 902 and 909, respectively, which may comprise, for example, a USB or a network cable. Depth map reconstruction module 113 receives the captured images 908, and determines correspondences between salient features in the images. Depth values are generated based on the offset or relative displacement between the corresponding salient features across the captured images. Depth values of locations not associated with the salient features may be interpolated from the depth values of locations associated with the salient features. Depth maps generated by the depth map reconstruction module 113 are communicated to storage device 910 and may be communicated to one or more remote devices over communication port 909. Depth maps generated by the depth map reconstruction module 113 are provided to the workstation 120 via bus 911. The workstation is in communication with one or more remote devices over network 127 using, for example, a network card internal to the workstation.

Using the user interface of the workstation, a user thereof may change or control the functionality of any of the modules and processing units comprising the stereo sensing system 900. Depth maps, masks, and the like, can be displayed on the display monitor 112 wherein various aspects thereof can be added, deleted, or otherwise modified by a user. Measurements and values generated by the system 900 may be displayed on the display device. Masks can be generated using the workstation and communicated to the mask module 901 via port 902. The captured images 908 may also be communicated to the workstation via bus 911 and displayed on the display monitor 112. A user can selectively set desired pixel density levels, select spatial patterns or define attributes of the spatial patterns, and may further define or otherwise set a desired operative resolution for the depth map reconstruction module. The workstation may further be used to identify one or more regions of interest in an image of the scene. The identified regions of interest can be communicated to the mask module 901, depending on the embodiment. The mask module may update the mask in response to the user input, in response to a region of interest changing in the scene, and a region of interest no longer being considered a region of interest. An operator of the workstation may modify the results generated by any of the modules or processing units of the adaptive depth sensing system 900 as needed and/or re-direct the modified results back to the same or different modules for further processing or re-processing.

Each module of the sensing systems of FIGS. 8 and 9 may have a specialized processor executing machine readable program instructions for performing their intended functions. A module may comprise an ASIC, an electronic circuit, a special purpose processor, and the like. A plurality of modules may be executed by a single special purpose computer system or a plurality of computer systems operating in parallel. Modules may include software/hardware which may further comprise an operating system, drivers, controllers, and other apparatuses some or all of which may be connected via a network. Various modules may designate one or more components. A plurality of modules may collectively perform a single function.

Triangulation

Figure 10:
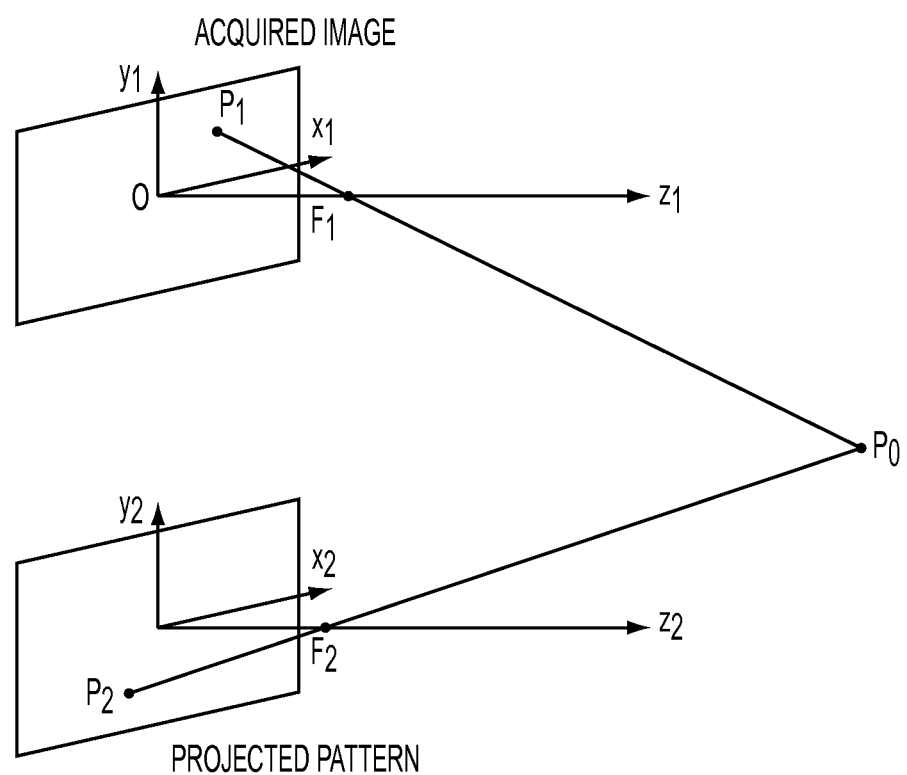
FIG. 10 illustrates one embodiment of how triangulation is performed in the active sensing system of FIGS. 1 and 8.

Reference is now being made to FIG. 10 which illustrates one embodiment of how triangulation is performed in the active stereo sensing system of FIGS. 1 and 8.

In this case, the origin of the global coordinate system O is placed at the center of the imaging plane of the imaging device. The camera focal point is located at coordinates $F_1$ at a distance $f_1$ from the origin O along the z axis; in other words, $F_1 = [0,0,f_1]^T$. An object point $P_0$ located at coordinates $[x_{P_0}, y_{P_0}, z_{P_0}]$ relative to O is imaged at point $P_1$ with coordinates $[x_{P_1}, y_{P_1}, 0]^T$. Since $P_0$, $F_1$ and $P_1$ are collinear, the relationship $P_1 = F_1 + \alpha(P_0 - F_1)$ holds for some scalar $\alpha_1$. The projector can be thought of as an inverse imaging system with an optical axis parallel to the same camera, centered at $O_2$ with coordinates $[x_2, y_2, z_2]^T$ relative to O and with focal point $F_2$ located at $[x_2, y_2, z_2+f_2]^T$. Assuming that the point $P_1$ imaged by the camera has been projected by the inverse imaging system from location $P_2=[x_2+x_{P_2},y_2+y_{P_2},z_2]^T$ which is collinear with $P_0$ and $F_2$ so that $P_2=F_2+\alpha_2(P_0-F_2)$ holds for some scalar $\alpha_2$. Expanding each of these equations into their scalar forms and simplifying, we get the following relationships:

$$z_{P_0} = \frac{f_1 f_2}{f_1 x_{P_2} - f_2 x_{P_1}}\left[x_2 + x_{P_2} - x_{P_1} + \frac{z_2 x_{P_2}}{f_2}\right] \quad (1)$$

$$z_{P_0} = \frac{f_1 f_2}{f_1 y_{P_2} - f_2 y_{P_1}}\left[y_2 + y_{P_2} - y_{P_1} + \frac{z_2 y_{P_2}}{f_2}\right] \quad (2)$$

Assuming the focal lengths of the camera and the projector $F_1$ and $F_2$ are known, as well as the location of the projector relative to the camera $O_2$, either EQ. (1) or (2) can be used to solve for $Z_{P_0}$, i.e., the distance from the point to the camera along the optical axis. Note that knowledge of $x_{P_2}$ or $y_{P_2}$ is enough to solve for $z_{P_0}$, which requires knowledge of the correspondence between $P_1$ and $P_2$. The use of uniquely coded patterns uniquely establishes this correspondence; alternatively, both equations can be solved and a functional combination of both solutions used as a final solution. Reconstructing a depth map of a scene comprises determining a set of scene point distances to the camera, that is, the values of $Z_{P_0}$ of a plurality of points in the scene. Since there is one such value for each projected feature for which a correspondence can be established, the resolution of the resulting depth map will depend on the density of such correspondences, which can be controlled by controlling the resolution of the pattern being projected.

Figure 11:
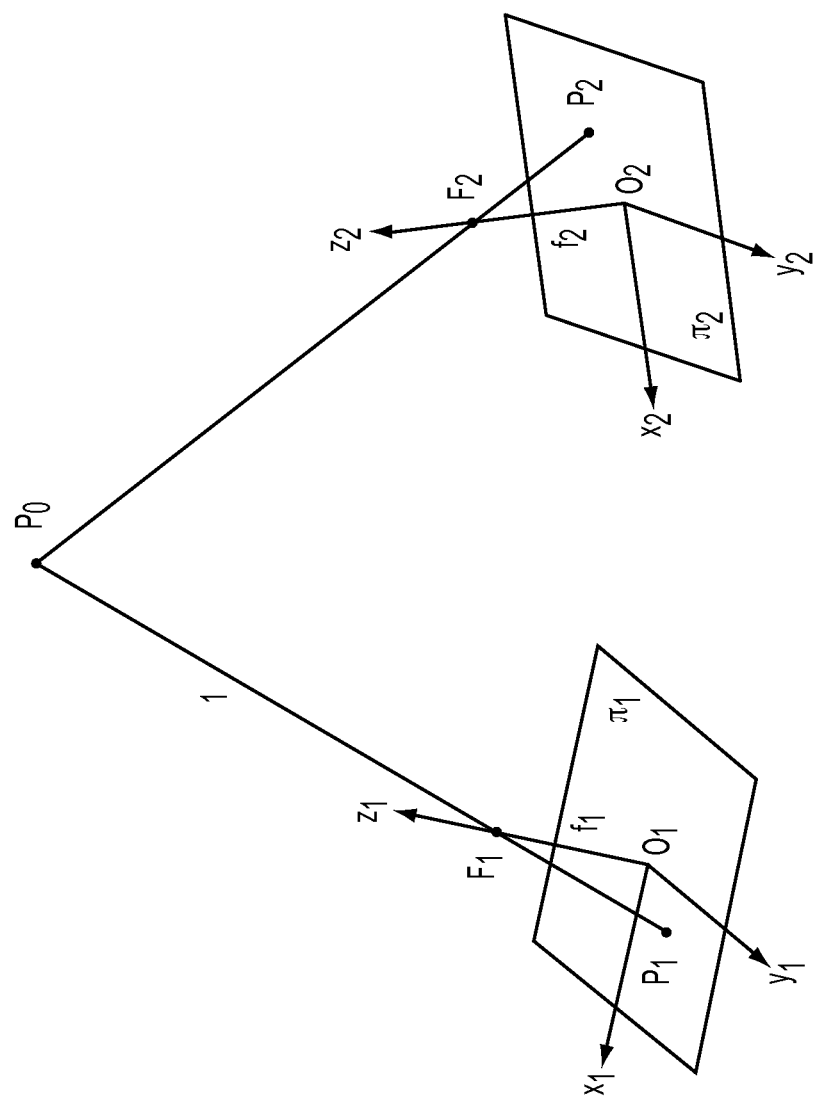
FIG. 11 illustrates one embodiment of how triangulation is performed in the passive stereo sensing system of FIGS. 2 and 9.

Reference is now being made to FIG. 11 which illustrates one embodiment of how triangulation is performed in the passive stereo sensing system of FIGS. 2 and 9. The two imaging devices define coordinate systems $x_1, y_1, z_1$ and $x_2, y_2, z_2$ with origins $O_1$ and $O_2$, respectively. The imaging devices can be approximately modeled as pinhole cameras with optical axis coinciding with their respective z coordinate axis. The two cameras have focal points located at $F_1$ and $F_2$ located at distances $f_1$ and $f_2$ from their respective origins along their respective z axis. Image planes $\pi_1$ and $\pi_2$ lie on planes $x_1, y_1$ and $x_2, z_2$, respectively. Coordinates between the two coordinate systems are related by the following expression:

$$\begin{bmatrix} x_2 \\ y_2 \\ z_2 \end{bmatrix} = R \begin{bmatrix} x_1 \\ y_1 \\ z_1 \end{bmatrix} + T \quad (4)$$

where R is a 3×3 orthonormal matrix describing a rotation operation and T is a 3×1 vector describing a translation.

Both devices stereoscopically image an object point $P_0$ located at coordinates $[x_{P_0},y_{P_0},z_{P_0}]^T$ relative to $O_1$ and at coordinates $[x'_{P_0},y'_{P_0},z'_{P_0}]^T$ relative to $O_2$ in the 3D space which projects onto point $P_1$ on image plane $\pi_1$ and onto point $P_2$ on image plane $\pi_2$. Note that $[x_{P_0}, y_{P_0}, z_{P_0}]^T$ and $[x'_{P_0}, y'_{P_0}, z'_{P_0}]^T$ are related by EQ. (4). Since both $P_1$ and $P_2$ are on their respective image planes, the coordinates of $P_1$ relative to $O_1$ are $P_1=[x_{P_1},y_{P_1},0]$ and the coordinates of $P_2$ relative to $O_2$ are $P_2=[x_{P_2},y_{P_2},0]^T$. Since $P_0$, $F_1$ and $P_1$ are collinear, and $P_0$, $F_2$ and $P_2$ are too, the relationships $P_1=F_1+\alpha_1(P_0-F_1)$ and $P_2=F_2+\alpha_2 (P_0-F_2)$ hold for some scalars $\alpha_1$ and $\alpha_2$. Expanding each of these equations into their scalar forms, we get:

$$\frac{x_{P_0}}{x_{P_1}} = \frac{y_{P_0}}{y_{P_1}} = \frac{f_1 - z_{P_0}}{f_1} \quad (5)$$

$$\frac{x'_{P_0}}{x_{P_2}} = \frac{y'_{P_0}}{y_{P_2}} = \frac{f_2 - z'_{P_0}}{f_2} \quad (6)$$

Assuming the focal lengths of the cameras, the matrix R which describes the rotation and the vector T which describes the translation between the cameras are known, and since the coordinates of $P_1$ and $P_2$, EQS. (4), (5) and (6) can be used to compute the coordinates of $P_0$ in the 3D world. Note that this assumes that a correspondence between $P_1$ and $P_2$ has been established. Reconstructing a depth map of a scene comprises determining a set of scene point distances to a given camera, that is, the values of $z_{P_0}$ or $z'_{P_0}$ (or functional combinations thereof) of a plurality of points in the scene.

Given two or more images acquired with two or more cameras with at least partially overlapping fields of view, the correspondence problem refers to the task of finding pairs of points (one point in each image) in the images which can be identified as being projections of the same points in the scene. Correspondences can be found via local correlations and via feature extraction and matching. The local resolution of the reconstructed depth map that comprises the set of established scene point depths is determined by the local density of correspondences, since depth values can only be computed for points for which a correspondence has been found. A density of depth values can be controlled by adjusting the density of extracted features to match in the images. A density of extracted features can be controlled, for example, by varying a selectivity threshold that determines how salient features are: the lower the threshold, the more lenient the requirements for saliency, and, in consequence, the larger the number of salient features extracted.

Assume that the location of an image point $P_1$ on image plane $\pi_1$ is known and that we need to find the location of the corresponding point $P_2$. Instead of searching across the whole image plane $\pi_2$ for corresponding point $P_2$, the size of the search space can be significantly reduced by noting that $P_2$ has to be located along the line segment defined by the intersection between $\pi_2$ and the plane defined by the points $P_1$, $F_1$ and $F_2$. This is referred to as the epipolar constraint.

OTHER EMBODIMENTS

Various aspects of the systems and methods described herein are intended to be incorporated in an article of manufacture which may be shipped, sold, leased, or otherwise provided separately either alone or as part of a product suite. The above-disclosed features and functions or alternatives thereof, may be combined into other systems and applications. Presently unforeseen or unanticipated alternatives, modifications, variations, or improvements may become apparent and/or subsequently made by those skilled in the art and, further, may be desirably combined into other different systems or applications. Changes to the above-described embodiments may be made without departing from the spirit and scope of the invention. The teachings of any printed publications including patents and patent applications, are each separately hereby incorporated by reference in their entirety.

What is claimed is:
1. A computer implemented method for adaptive depth map reconstruction, the method comprising:

receiving a mask identifying at least one region of interest (ROI) of a subject of interest in a scene;

using an active stereo device for acquiring an image of said scene, said active stereo device comprising an illuminator for projecting an undistorted pattern of source light with known spatio-temporal attributes onto said scene, and an imaging device for detecting a reflection of said projected pattern of source light off surfaces in said scene in which said ROI is moving due to respiration by said subject of interest; and reconstructing, by a depth map reconstruction module, a depth map of said scene from said acquired image, wherein reconstructing said depth map comprises:

establishing correspondences between spatial attributes of said projected undistorted pattern of light and spatial attributes in said detected pattern of light;

changing a density of said established correspondences to be higher at locations corresponding to said ROI, as identified by said mask while a density of said established correspondences not associated with said ROI is unchanged at locations other than said ROI, and wherein said changing said density of said established correspondences to be higher at locations corresponding to said ROI includes using a higher number of colors as identified by said mask while using a lower number of colors at locations other than said ROI;

determining offsets between said established correspondences;

triangulating said offsets to obtain depth values; and aggregating said depth values to reconstruct said depth map, said reconstructed depth map being such that a spatial resolution in said ROI is higher relative to a spatial resolution of scene locations not associated with said ROI.

2. A system for adaptive depth map reconstruction, the system comprising:

a mask identifying at least one region of interest (ROI) of a subject of interest in a scene;

an active stereo device for acquiring an image of said scene, said active stereo device comprising an illuminator for projecting an undistorted pattern of source light with known spatio-temporal attributes onto said scene, and an imaging device for detecting a reflection of said projected pattern of source light off surfaces in said scene in which said ROI is moving due to respiration by said subject of interest; and a depth map reconstruction module comprising a processor executing machine readable program instructions for reconstructing a depth map of said scene from said acquired image, wherein reconstructing said depth map comprises:

establishing correspondences between spatial attributes of said projected undistorted pattern of light and spatial attributes in said detected pattern of light;

changing a density of said established correspondences to be higher at locations corresponding to said ROI, as identified by said mask while a density of said established correspondences not associated with said ROI is unchanged at locations other than said ROI, and wherein said changing said density of said established correspondences to be higher at locations corresponding to said ROI includes using a higher number of colors as identified by said mask while using a lower number of colors at locations other than said ROI;

determining offsets between said established correspondences;

triangulating said offsets to obtain depth values; and aggregating said depth values to reconstruct said depth map, said reconstructed depth map being such that a spatial resolution in said ROI is higher relative to a spatial resolution of scene locations not associated with said ROI.

3. The system of claim 2, wherein said mask is updated in real-time in response to any of: a location of said ROI changing in said scene, a new ROI being identified in said scene, a ROI no longer being considered an ROI, and a user input.

4. A computer implemented method for adaptive depth map reconstruction, the method comprising:

receiving a mask identifying at least one region of interest (ROI) of a subject of interest in a scene;

using an active stereo device for acquiring an image of said scene, said active stereo device comprising an illuminator for projecting an undistorted pattern of source light with known spatio-temporal attributes onto said scene, and an imaging device for detecting a reflection of said projected pattern of source light off surfaces in said scene in which said ROI is moving due to respiration by said subject of interest; and reconstructing, by a depth map reconstruction module, a depth map of said scene from said acquired image, wherein reconstructing said depth map comprises:

establishing correspondences between spatial attributes of said projected undistorted pattern of light and spatial attributes in said detected pattern of light;

changing a density of said established correspondences to be higher at locations corresponding to said ROI, as identified by said mask while a density of said established correspondences not associated with said ROI is decreased at locations other than said ROI, and wherein said changing said density of said established correspondences to be higher at locations corresponding to said ROI includes using a higher number of colors as identified by said mask while using a lower number of colors at locations other than said ROI;

determining offsets between said established correspondences;

triangulating said offsets to obtain depth values; and aggregating said depth values to reconstruct said depth map, said reconstructed depth map being such that a spatial resolution in said ROI is higher relative to a spatial resolution of scene locations not associated with said ROI.

* * * * *